(12) United States Patent
Fisunenko et al.

(10) Patent No.: US 9,400,561 B2
(45) Date of Patent: Jul. 26, 2016

(54) METHOD OF OPERATING GESTURE BASED COMMUNICATION CHANNEL AND PORTABLE TERMINAL SYSTEM FOR SUPPORTING THE SAME

(71) Applicant: Samsung Electronics Co., Ltd., Suwon-si, Gyeonggi-do (KR)

(72) Inventors: Andriy Fisunenko, Kherson (UA); Oleksii Mokhonko, Kiev (UA); Igor Kryvoruchko, Donetsk region (UA); Oleksiy Kasitskiy, Kiev (UA)

(73) Assignee: Samsung Electronics Co., Ltd (KR)

( * ) Notice: Subject to any disclaimer, the term of this patent is extended or adjusted under 35 U.S.C. 154(b) by 44 days.

(21) Appl. No.: 13/628,988

(22) Filed: Sep. 27, 2012

(65) Prior Publication Data

US 2013/0090065 A1 Apr. 11, 2013

(30) Foreign Application Priority Data

Sep. 30, 2011 (KR) .................. 10-2011-0099576

(51) Int. Cl.
*H04W 4/20* (2009.01)
*G06F 3/01* (2006.01)
*H04W 4/00* (2009.01)
*G06F 3/0488* (2013.01)
*H04W 76/02* (2009.01)

(52) U.S. Cl.
CPC .............. *G06F 3/017* (2013.01); *G06F 3/0488* (2013.01); *G06F 3/04883* (2013.01); *H04W 4/005* (2013.01); *H04W 76/023* (2013.01)

(58) Field of Classification Search
CPC ................................ H04W 4/02; H04W 4/206
See application file for complete search history.

(56) References Cited

U.S. PATENT DOCUMENTS

| 7,532,196 | B2 * | 5/2009 | Hinckley .................. 345/156 |
| 2006/0146765 | A1 | 7/2006 | Van De Sluis et al. |
| 2006/0256074 | A1 | 11/2006 | Krum et al. |
| 2007/0124503 | A1 * | 5/2007 | Ramos et al. .................. 709/248 |
| 2009/0225039 | A1 | 9/2009 | Williamson et al. |
| 2009/0309846 | A1 | 12/2009 | Trachtenberg et al. |
| 2010/0020025 | A1 * | 1/2010 | Lemort et al. .................. 345/173 |
| 2010/0259486 | A1 | 10/2010 | Anson et al. |
| 2011/0018821 | A1 * | 1/2011 | Kii ....................... G06F 3/04883 345/173 |
| 2011/0037712 | A1 | 2/2011 | Kim et al. |
| 2011/0055774 | A1 * | 3/2011 | Kim et al. ..................... 715/863 |
| 2011/0252317 | A1 * | 10/2011 | Keranen et al. .............. 715/702 |
| 2012/0077436 | A1 * | 3/2012 | Konded et al. ............... 455/41.2 |
| 2012/0282859 | A1 * | 11/2012 | Mayer et al. ................. 455/41.2 |

FOREIGN PATENT DOCUMENTS

KR 20090037061 4/2009

OTHER PUBLICATIONS

European Search Report dated May 29, 2015 issued in counterpart application No. 12835778.6-1959, 7 pages.

* cited by examiner

*Primary Examiner* — Lewis West
*Assistant Examiner* — Dong-Chang Shiue
(74) *Attorney, Agent, or Firm* — The Farrell Law Firm, P.C.

(57) ABSTRACT

Methods and apparatus are provided for operating a close proximity communication channel based on a gesture. A gesture event is generated on a touch screens of a portable terminal. The portable terminal includes a close proximity communication module. The portable terminal generates a context message corresponding to the gesture event. The context message is transmitted to at least one other portable terminal. The close proximity communication channel is established based on the context message.

17 Claims, 8 Drawing Sheets

METHOD OF OPERATING GESTURE BASED COMMUNICATION CHANNEL AND PORTABLE TERMINAL SYSTEM FOR SUPPORTING THE SAME

PRIORITY

This application claims priority under 35 U.S.C. §119(a) to an application filed in the Korean Intellectual Property Office on Sep. 30, 2011, and assigned Ser. No. 10-2011-0099576, the contents of which are incorporated herein by reference.

BACKGROUND OF THE INVENTION

1. Field of the Invention

The present invention relates generally to the formation of a communication channel based on a communication module in close proximity, and more particularly, to a method of operating a communication channel based on a simple gesture, and a portable terminal system for supporting the same.

2. Description of the Related Art

Recently, technology has rapidly developed for miniaturizing batteries while maintaining their electronic capacity. For example, a portable terminal has a file playback function capable of playing and listening to an audio file, such as a music file, and a video file, such as previously stored images. Further, the portable terminal has various additional functions, such as, for example, a camera function for photographing still images and a video camera function for tracking and photographing moving images. The portable terminal provides functions for forming a communication channel with a certain portable terminal location that is within close proximity. The portable terminal transmits/receives data or controls mobile communication using a base station. A Bluetooth module or the like may represent a communication module having a close proximity communication function.

When a conventional portable terminal searches for peripheral communication devices to use with the close proximity communication function, authentication information is transmitted/received and confirmed between devices. This authentication information may be embodied as PIN information, for example. Accordingly, in order for the user to use a close proximity communication function, a communication setting between two devices must match and authentication information transmitted/received between the two devices must be confirmed. A user that is unaccustomed to the foregoing procedure may be greatly inconvenienced in trying to establish a connection between close proximity communication devices. Furthermore, the foregoing procedure may have to be repeated performed according to different situations. This inconvenience can become an intervening factor that results in an interruption in use of a close proximity communication function.

SUMMARY OF THE INVENTION

The present invention has been made to address at least the above problems and/or disadvantages and to provide at least the advantages described below. Accordingly, an aspect of the present invention provides a method of operating a communication channel between terminals by only simple gesture, and a portable terminal system supporting the same.

In accordance with an aspect of the present invention, a method is provided for operating a close proximity communication channel based on a gesture. A gesture event is generated on a touch screens of a portable terminal. The portable terminal includes a close proximity communication module. The portable terminal generates a context message corresponding to the gesture event. The context message is transmitted to at least one other portable terminal. The close proximity communication channel is established based on the context message.

In accordance with another aspect of the present invention, a portable terminal system is provided for supporting gesture-based operation of a close proximity communication channel. The system includes a first portable terminal having a first touch screen a close proximity communication module. The system also includes a second portable terminal having a second touch screen. The second portable terminal forms a close proximity communication channel with the first portable terminal. The first portable terminal and the second portable terminal generate gesture events on the first and second touch screens, respectively, generate and at least one of transmit and receive a context message corresponding to the gesture events, and establish the close proximity communication channel based on the context message.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numbers although they are illustrated in different drawings. Detailed descriptions of constructions or processes known in the art may be omitted to avoid obscuring the subject matter of the present invention.

Figure 1:
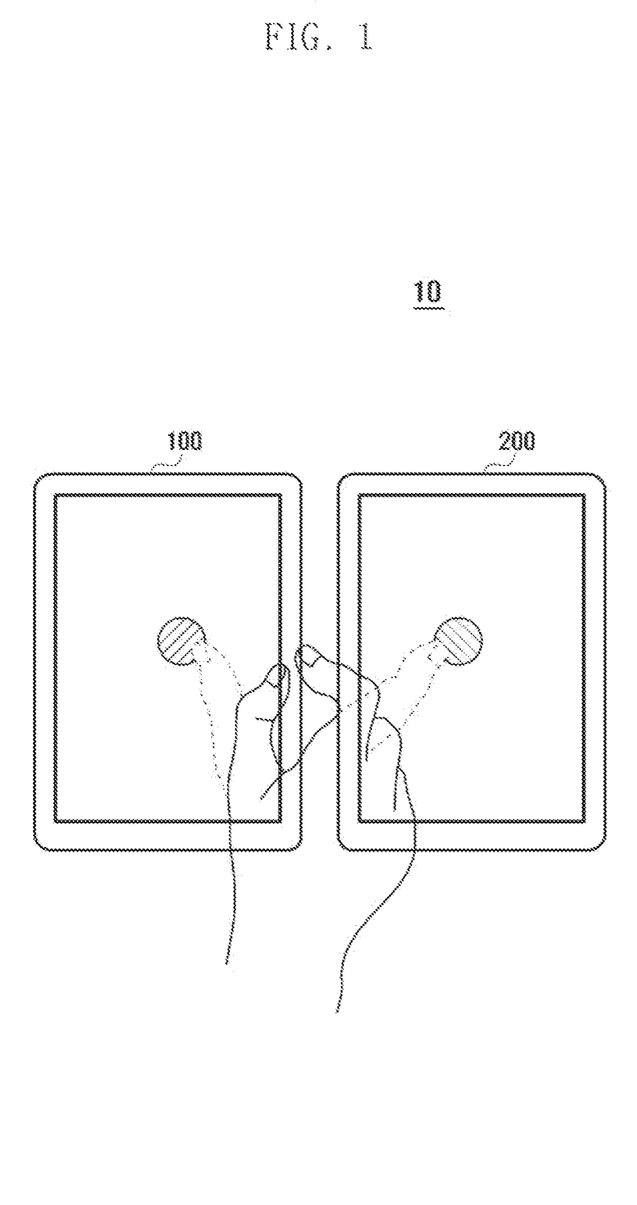
FIG. 1 is a diagram illustrating a configuration of a system including portable terminals in which a close proximity communication channel is operated, according to an embodiment of the present invention.

FIG. 1 is a diagram schematically illustrating a configuration of a system for operating a close proximity communication channel, according to an embodiment of the invention.

Referring to FIG. 1, a system 10 for operating a close proximity communication channel includes a first portable terminal 100 and a second portable terminal 200, each having a close proximity communication module. In the system 10 for operating the close proximity communication channel, the close proximity communication channel of the two portable terminals 100 and 200 is able to be formed and released, and information transmission/reception is performed based on and simultaneously with an input signal or within a given time interval in the first portable terminal 100 and the second portable terminal 200. In particular, in the system 10 for operating the close proximity communication channel, the input signal may be based on gesture events generated in the respective portable terminals 100 and 200. Thus, a function associated with the close proximity communication channel of the portable terminals 100 and 200 may be operated by a performing a simple operation.

The first portable terminal 100 may include a close proximity communication module and a touch screen for recognizing a user gesture. The first portable terminal 100 may support various user functions according to an input signal generated by the touch screen. Particularly, if a given input signal corresponds to a certain gesture from a touch screen in a certain mode state, the first portable terminal 100 may search for peripheral communication devices based on a context message according to the input signal. If a communication device that is searching a periphery according to another context message or a communication device providing a response message according to the certain context message is found, the first portable terminal 100 may form a close proximity communication channel with a corresponding communication device. Further, if an input signal is provided corresponds to a given gesture from the touch screen in a state in which the close proximity communication channel is formed with the second portable terminal 200, the first portable terminal 100 may release a communication channel connection with the second portable terminal 200 and transmit and receive certain information to and from the second portable terminal 200 based on a context message corresponding to the input signal. An input signal that is generated from the touch screen of the first portable terminal 100 may be a associated with an input signal generated from the touch screen of the second portable terminal 200.

The second portable terminal 200 may include a close proximity communication module similar to the first portable terminal 100, and a touch screen for recognizing a user gesture. The second portable terminal 200 forms a close proximity communication channel with the first portable terminal 100, releases the formed close proximity communication channel, or perform information transmission/reception. If a given input signal corresponding to a certain gesture is generated from the touch screen while in a certain mode, the second portable terminal 200 may create a corresponding context message and search for peripheral devices for forming a close proximity channel, as in the first portable terminal 100. Further, the second portable terminal 200 may receive a certain context message for searching peripheral devices from the first portable terminal 100 after generation of the given input signal. The second portable terminal 200 may transfer a message for forming a communication channel with the first portable terminal 100 to the first portable terminal 100. If a gesture event corresponding to a certain input is generated in a state in which the close proximity communication channel with the first portable terminal 100 is formed, the second portable terminal 200 may release the close proximity communication channel connection and transmit/receive certain information.

As described above, if a given input signal is generated in portable terminals 100 and 200, the system 10 for operating the close proximity communication channel of the invention may generate a context message corresponding to the input signal, form a mutual close proximity communication channel based thereon, release connection of the mutual close proximity communication channel, or support information transmission/reception. Configurations of the portable terminals 100 and 200 supporting a close proximity communication channel operation function are described in greater detail below, in accordance with embodiments of the present invention.

Figure 2:
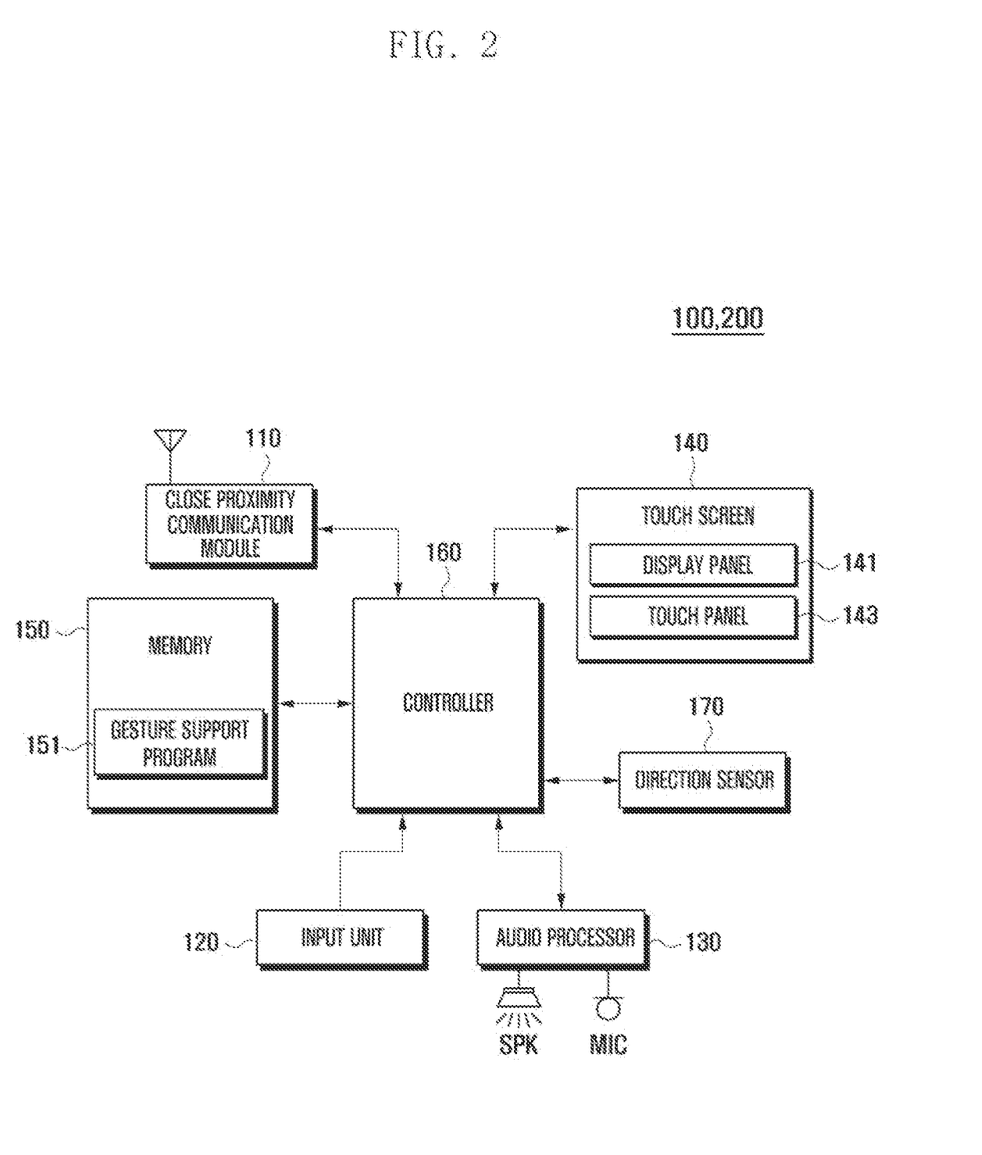
FIG. 2 is a block diagram illustrating a configuration of each portable terminal, according to an embodiment of the present invention.

FIG. 2 is a block diagram illustrating a configuration of each of the portable terminals 100 and 200, according to an embodiment of the present invention. As described above, the first portable terminal 100 and the second portable terminal 200 may have the same configuration. Accordingly, hereinafter, configurations of the portable terminals 100 and 200 will be described with reference to a single drawing.

Referring to FIG. 2, each of the portable terminals 100 and 200 of the invention includes a close proximity communication module 110, an input unit 120, an audio processor 130, a memory 150, a touch screen 140, and a controller 160. Each of the portable terminals 100 and 200 also include a direction sensor 170 for sensing an orientation of a terminal when a gesture event is generated. Additionally, when the portable terminals 100 and 200 support a mobile communication function, each of the portable terminals 100 and 200 may further include a communication module for supporting a mobile communication function.

Each of the portable terminals 100 and 200 may be set in a close proximity communication function mode for operating the close proximity communication module 110, for example, a close proximity communication function preparation mode and a close proximity communication channel connection mode. The close proximity communication function preparation mode is a mode for operating a close proximity communication function, and may be a mode for preparing the close proximity communication module 110 in an active state to support formation of a close proximity communication channel. Each of the portable terminals 100 and 200 may perform a procedure for forming a close proximity communication channel with peripheral communication devices including a close proximity communication module, according to a gesture event corresponding to an input signal from the touch screen 140. In particular, each of the portable terminals 100 and 200 may create a context message including at least one of time point information when the gesture event is generated from the touch screen 140, gesture form information corresponding to the gesture event, and terminal direction information when the gesture event is generated. Each of the portable terminals 100 and 200 may transmit the created context message to peripheral communication devices, and form a close proximity communication channel with a communication device in response to the context message. The context message may further contain information regarding a user function corresponding to a gesture event and address information of a user. Further, the context message may include only the gesture form information and gesture event generation time point information, according to intention of a designer. the close proximity communication module 110 may be activated under the control of the controller 160 to broadcast the context message and to receive a response message corresponding to the context message from peripheral communication devices. Further, the close proximity communication module 110 may form a close proximity communication channel with a peripheral communication device that transmitted a response message corresponding to the context message. If the certain gesture event is generated in a state in which the portable terminals 100 and 200 form a close proximity communication channel, the close proximity communication module 110 transfers a new context message corresponding to certain the gesture event to release a connected close proximity communication channel or to transmit certain information. Further, the close proximity communication module 110 may receive a context message provided from another portable terminal. The received context message is transferred to the controller 160. The received context message may contain at least one of gesture form information of a gesture event generated on a touch screen of a terminal of the other party, generation time point information of the gesture event, terminal direction information of the generation time point in the gesture event, address information of the terminal of the other party, and user function information corresponding to the gesture event in the same manner as in the transmitted context message.

The input unit 120 includes a plurality of input keys and function keys for receiving input of numerals or character information and for setting various functions. The function keys may include arrow keys, side keys, and short keys, which are set such that certain functions are performed. Further, the input unit 120 generates a key signal associated with a user setting and function control of the portable terminals 100 and 200, and transfers the generated key signal to the controller 160. Particularly, the input unit 120 may generate an input signal for selecting a close proximity communication function mode for operating a gesture based close proximity communication channel and an input signal for releasing the close proximity communication function mode. In addition, the input unit 120 may generate an input signal capable of selecting certain contents stored in the portable terminals 100 and 200 according to user control.

The audio processor 130 includes a speaker SPK for outputting audio data transmitted/received during a call, audio data included in a message, and audio data stored in the memory 150. The audio processor 130 also includes a microphone MIC for collecting a voice of the user or other audio signals during the call. When an input signal corresponding to a certain gesture from the touch screen 140 is generated, the audio processor 130 may output an effect sound corresponding to the generation of the corresponding input signal. Further, when a close proximity communication channel is formed between the portable terminals 100 and 200 or the formed close proximity communication channel is released, the audio processor 130 may output a corresponding guide sound. Furthermore, when contents are transmitted/received by generation of a gesture event corresponding to a certain input signal from the touch screen 140, the audio processor 130 may output a guide sound or an effect sound with respect to transmission and reception of corresponding contents. The output of the effect sound may be omitted according to a setting of the audio processor 130 set by the user.

The touch screen 140 generates a gesture event associated with a close proximity communication channel operation. The touch screen 140 may include a touch panel 143 and a display panel 141. The touch panel 143 is disposed in one of an upper portion and a lower portion of the display panel 141, and generates and transfers a touch event, according to an approach of or a contact with an object, to the controller 160. The touch panel 143 may be provided in a matrix pattern for collect a touch event generally contacting the display panel 141. In particular, the touch panel 143 may trace a track of contact points according to a given gesture to collect gesture events composed of a touch-down event, a touch-drag event, and a touch-release event. The touch-down event may be generated at a point where an object contacts on the touch panel 143 by a gesture operation. The touch-drag event may be generated as the touch is moved at a certain speed in at least one direction by a given distance while maintaining the touch. The touch-release event may be generated at a point where a touch-drag event is terminated. The user may contact and move on the touch panel 143 of each of the portable terminals 100 and 200 using a finger in order to generate gesture events according to a given gesture. The gesture events generated by the portable terminals 100 and 200 may be used in configuring a context message, which is a signal for operating a close proximity communication channel. The foregoing embodiment of the present invention has illustrated that the gesture events include a touch-drag event, however, the embodiments of the present invention are not limited thereto. Specifically, the gesture events may include various events such as, for example, a tap event generated by tapping the touch panel 143 of each of the portable terminals 100 and 200.

The display panel 141 provides various screen interfaces necessary for operations of the portable terminals 100 and 200. Specifically, the display panel 141 displays information input by a user or information provided to the user as well as various menus of the portable terminals 100 and 200. For example, the display panel 141 may provide various screens, such as, an idle screen, a menu screen, a message creation screen, a call screen, a game screen, and a music playback screen. The display panel 141 may be configured by a Liquid Crystal Display (LCD) or an Organic Light Emitted Diode (OLED). Particularly, the display panel 141 may provide a screen for operating a close proximity communication channel. For example, the display panel 141 may output a screen according to setting a close proximity communication function mode, a screen for executing automatic-pairing by gesture events generated by the touch screen 140 of the portable terminals 100 and 200, a formation screen of a close proximity communication channel, a screen for releasing connection of the close proximity communication channel according to certain gesture events, and a screen for transmitting a certain contents file according to certain gesture events when the close proximity communication channel is formed. The screens are described in greater detail below.

The memory 150 may store not only an application program necessary for a function operation according to an embodiment of the present invention, but also an application program for playing various stored files, an application program for operating the close proximity communication module 110, and key maps or menu maps for operating the touch screen 140. The key maps and the menu maps may be embodied in various forms. Specifically, the key maps may be keyboard maps or 3*4 key maps, and control key maps for controlling and operating currently activated applications. The menu maps may control an operation of a currently activated application program and menu maps with various menus provided from the portable terminal. The memory 150 may chiefly include a program area and a data area.

The program area may store an Operating System (OS) for booting the portable terminals 100 and 200 and for operating the foregoing elements. The program area may also store application programs for playing various files, such as, for example, an application program for supporting a call function according to a presence of function support of the portable terminals 100 and 200, a web browser for accessing an Internet server, a music playback application program for playing other sound sources, an image output application program for displaying photographs or the like, and a moving image playback application program. In particular, the program area may include a gesture support program 151 for supporting a gesture based close proximity communication function.

The gesture support program 151 includes various routines for operating the close proximity communication function. For example, the gesture support program 151 may include a preparation mode setting routine for operating the close proximity communication function, a routine for collecting generation of a preset gesture event in a preparation mode state for operation of the close proximity communication function, a routine for generating a context message based on the generated gesture event, and a routine for broadcasting the generated context message to peripheral communication devices. When information associated with a context message or a gesture event is included in a routine for receiving the context message from the peripheral communication devices and the received context message, the gesture support program 151 may include a routine for transmitting a response message thereto. When receiving a response message to a context message broadcasted from another portable terminal before transmitting the response message, the gesture support program 151 may include a routine supporting performance of an automatic procedure without transmitting a separate response message. Further, when receiving the response message, the gesture support program 151 may include a channel forming routine for forming a close proximity communication channel with peripheral communication devices that transmitted the response message. The channel forming routine may include a routine for performing automatic pairing based on the context message in the procedure of forming the close proximity communication channel, and a routine for forming the close proximity communication channel after completing performance of the automatic pairing operation. Further, the gesture support program 151 may have a routine for releasing a connected close proximity communication channel when a given gesture event is generated in a formed state of the close proximity communication channel, and a routine for transferring and receiving a predetermined contents file according to a corresponding gesture event when the given gesture event is generated while the close proximity communication channel is formed.

The data area is an area in which data, which was created according to the use of the portable terminal, is stored. The data area may temporarily store a context message transmitted/received for operating the close proximity communication channel based on a gesture. The temporarily stored context message may be used as information for which the portable terminals 100 and 200 mutually form the close proximity communication channel. Further, the data area may store contents files to be transmitted/received while the close proximity communication channel is formed. The stored contents files may be transferred to another portable terminal according to user designation and the gesture event. Particularly, the data area may store previously defined gesture event information. The previously defined gesture event information may contain information defining a user function to be executed when a certain gesture event is generated in a certain mode. The previously defined gesture event information may also contain generation time point information and gesture form information that are included in a context message of a terminal of the other party to be operated associated with the user function.

The direction sensor 170 collects orientation information of the portable terminals 100 and 200. The direction sensor 170 may be configured by at least one of various sensors, such as, for example, a gyroscope sensor, a geo-magnetic sensor, and an acceleration sensor. The direction sensor 170 may automatically activate according to the control of the controller 160 in a close proximity communication function mode, and collect orientation information when the gesture event is collected. The collected orientation information may be transferred to the controller 160 and used for creating the context message. Accordingly, the invention may additionally confirm the orientation information such that portable terminals mutually identify an operation of the close proximity communication function to precisely and exactly search terminals operating the close proximity communication function.

The controller 160 may control a power supply to respective elements of the portable terminals 100 and 200 to perform an initializing procedure. If the initializing procedure is terminated, the controller 160 may control signal flow of the respective elements such that the gesture based close proximity communication channel operation function is performed.

Figure 3:
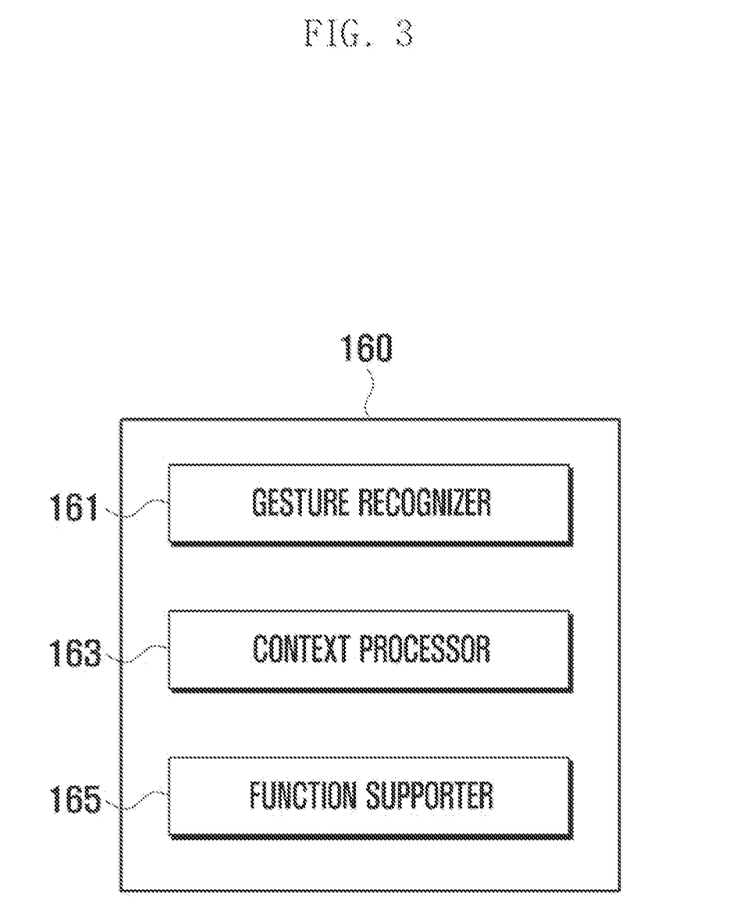
FIG. 3 is a block diagram illustrating a configuration of a controller shown in FIG. 2, according to an embodiment of the present invention.

FIG. 3 is a diagram illustrating the controller 160, according to an embodiment of the present invention. The controller 160 includes a gesture recognizer 161, a context processor 163, and a function supporter 164.

The gesture recognizer 161 collects a touch event generated by the touch screen 140 of the portable terminals 100 and 200, and checks whether the collected touch event corresponds to the previously defined gesture event. Moreover, the gesture recognizer 161 may search a previously defined gesture event based on terminal orientation information provided from the direction sensor 170. As described above, the memory 150 may store previously defined gesture event information and provide it according to a request of the gesture recognizer 161. If the touch event is generated from the touch screen 140, the gesture recognizer 161 may check which gesture event information of the previously defined gesture event information it is. The previously defined gesture event information may contain at least one of gesture event information instructing automatic pairing and formation of the close proximity communication channel, gesture event information for releasing the formation of the close proximity communication channel when it is formed, and gesture event information for transferring certain contents files during the formation of the close proximity communication channel.

Furthermore, the gesture recognizer 161 may search previously defined gesture event information according to the orientation information provided from the direction sensor 170. To do this, the previously defined gesture event information may contain orientation information together with the foregoing information. Further, the gesture recognizer 161 may collect time point information when a touch event is generated on the touch screen 140 together with gesture form information corresponding to a touch event. The gesture recognizer 161 may transfer the previously defined gesture event information and generation time point information corresponding to the gesture form information to the context processor 163. When orientation information is designed for operating the close proximity communication channel, the orientation information may be transferred to the context processor 163.

The context processor 163 creates a context message based on the generation time point information and the gesture event information provided from the gesture processor 161, and creates support such that the orientation information is added according to a design scheme to create the context message. Accordingly, the context message may contain information instructing when a touch event is generated in a certain form. Moreover, the context processor 163 may provide control such that the generated context message is broadcasted to peripheral communication devices. The context processor 163 controls the close proximity communication module 110 to be activated, and transfers a broadcasting message for connection of a close proximity communication channel and release connection of the close proximity communication channel, or a broadcasting message for transmitting contents files based on the close proximity communication channel to the peripheral communication devices.

The context processor 163 may receive the context message broadcasted from another portable terminal. The context processor 163 checks generation time information of a gesture event included in the received context message to determine whether it matches a generation time point of a gesture event generated from the terminal itself, or it is generated within an allowable range. Simultaneously, the context processor 163 may determine whether the gesture formation information corresponds to a form of a gesture event generated from the terminal itself, such as, for example, gesture form information of the same direction or a direction opposite thereto. Further, the context processor 163 may selectively check whether orientation information included in the received context message is connected with orientation information itself according to a design scheme. When the information included in the received context message corresponds to gesture event information collected by the terminal itself through the checking procedure, the context processor 163 may execute various user functions with a terminal having broadcasted a corresponding context message according to support of the function supporter 165. Address information of a terminal having broadcasted a corresponding message may be contained in a received context message. Furthermore, the address information is included in the context message to be transmitted.

When the context message is received from another terminal, the context processor 163 may provide support such that a close proximity communication function is operated according to the control of the function supporter 165, after checking the received context message without broadcasting the context message. The context processor 163 may broadcast a context message itself to peripheral communication devices regardless of reception of the context message. In addition, the context processor 163 may provide support such that a close proximity communication function is operated between the portable terminals 100 and 200, which generate a gesture event corresponding to the context message according to support of the function supporter 165.

The function supporter 165 supports various user functions of the portable terminals 100 and 200, particularly, a close proximity communication function. The function supporter 165 may provide control such that automatic pairing with a terminal transmitting/receiving a context message from the context processor 163 is performed to form a close proximity channel. The function supporter 165 may provide control such that the automatic pairing is performed If a context message for connection release is transmitted/received while the close proximity communication channel is formed, signal processing for releasing the close proximity communication channel may be performed.

Figure 4:
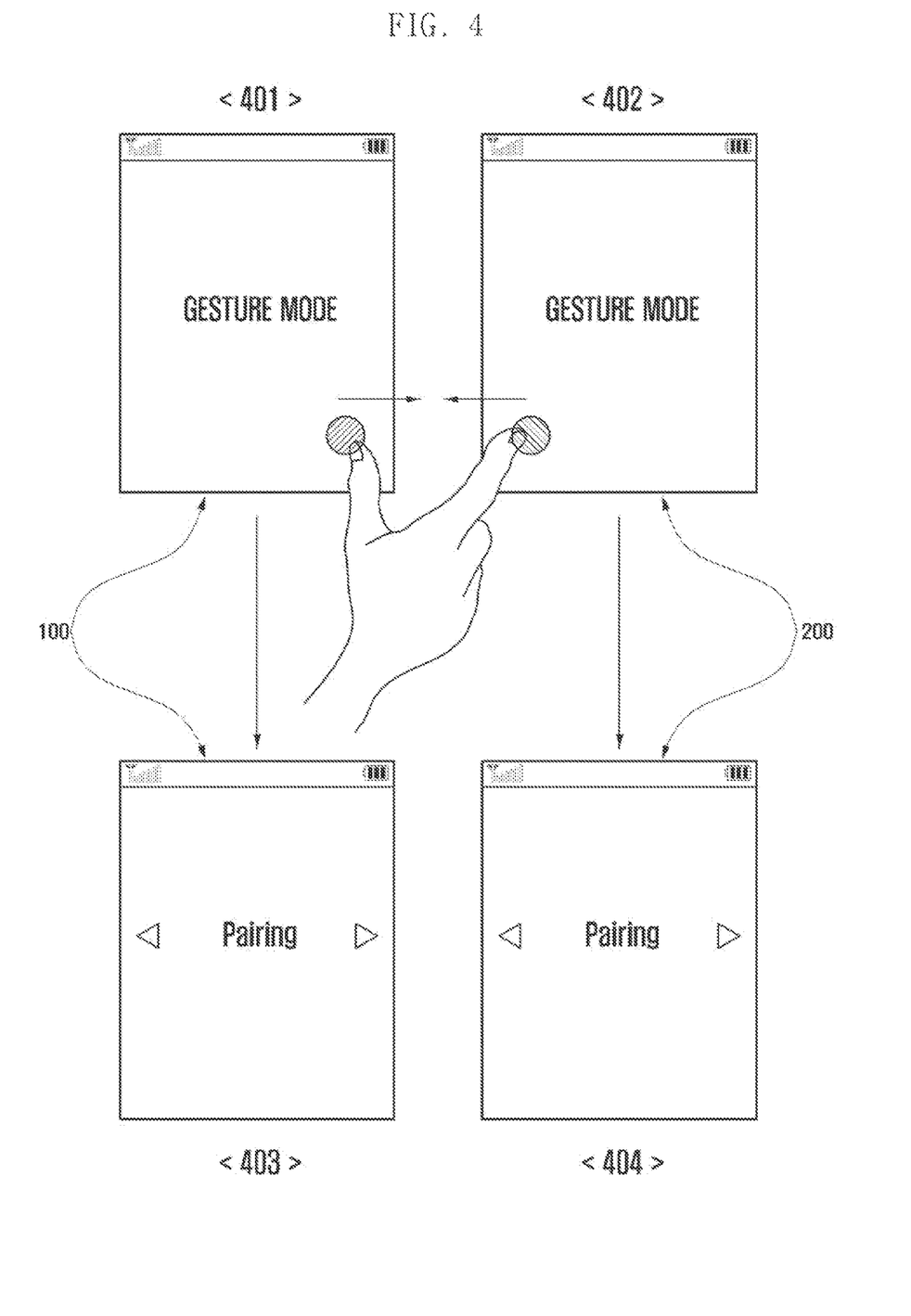
FIG. 4 is a diagram illustrating a screen for describing gesture recognition for automatic pairing, according to an embodiment of the present invention.

FIG. 4 is a diagram illustrating a screen for describing a pairing procedure to form a close proximity communication channel during a close proximity communication channel operation, according to an embodiment of the present invention.

Referring to FIG. 4, as illustrated in a screen 401 and a screen 402, the user may arrange the two portable terminals 100 and 200 so that they are parallel to each other. The user may arrange the first portable terminal 100 and the second portable terminal 200 so that their front surfaces and touch screens 140 are facing the same direction. The user may also arrange the first portable terminal 100 and the second portable terminal 200 so that they are neighboring each other. The user may perform an operation for generating gesture events on a touch screen of the first portable terminal 100 and on a touch screen of the second portable terminal 200 for pairing to form a close proximity communication channel. For example, the user simultaneously touches the touch screen of the first portable terminal 100 and the touch screen of the second portable terminal 200 using one hand and then performs drag operations in directions toward each other. Specifically, the user drags from left to right on the touch screen of the first portable terminal 100 and drags from right to left on the touch screen of the second portable terminal 200.

The first portable terminal 100 may collect a gesture event according to a touch operation of a user, and create a context message corresponding to the gesture event. The first portable terminal 100 may collect time point information indicating when the gesture event is generated and gesture form information corresponding to the drag event from left to right. The first portable terminal 100 may perform an operation for matching a gesture event corresponding to the drag event with a certain gesture event previously defined in a memory 150. Further, the gesture event corresponding to the drag event is matched with the certain gesture event, and the first portable terminal 100 may check a user function of the certain gesture event. The user function of the certain gesture event is a close proximity communication channel formation function. The first portable terminal 100 may generate a context message for forming a close proximity communication channel. If the context message is generated, the first portable terminal 100 may broadcast the generated context message. The second portable terminal 200 may perform the same procedures as the first portable terminal 100 to generate and broadcast the context message.

Accordingly, the first portable terminal 100 and the second portable terminal 200 may transmit/receive the context message within a given time after generation of the gesture event. If the context message is transmitted/received, each of the portable terminals 100 and 200 checks and compares a corresponding context message with its context message or its gesture event information. When the corresponding context message is associated with its context message or its gesture event information, pairing for forming a close proximity communication channel with a terminal broadcasting a corresponding context message may be performed, as illustrated in screens 403 and 404 of FIG. 4. The portable terminals 100 and 200 may provide control such that a pairing procedure is automatically performed based on the context message or relation with a gesture event without checking separate PIN information. After the pairing procedure, the portable terminals 100 and 200 may form a close proximity communication channel.

As described above, the system 10 for operating a close proximity communication channel based on a gesture may form or release a close proximity communication channel between the portable terminals 100 and 200, or transfers contents files using a simple gesture operation, such that a terminal is intuitively operated.

Figure 5:
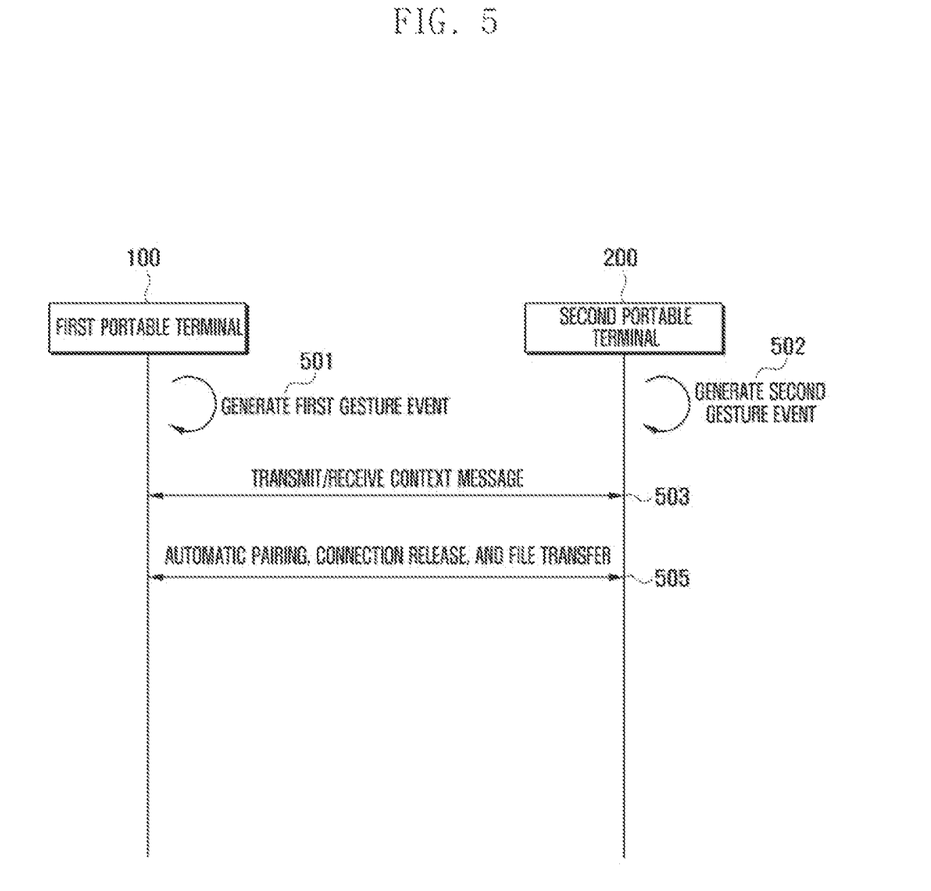
FIG. 5 is a sequence diagram illustrating a method of operating a gesture based close proximity communication channel, according to an embodiment of the present invention.

FIG. 5 is a sequence diagram illustrating a method of operating a gesture based close proximity communication channel, according to an embodiment of the present invention.

Referring to FIG. 5, in the method of operating a gesture based close proximity communication channel according to embodiments of the present invention, a first gesture event 501 and a second gesture event 502 are generated in the first portable terminal 100 and the second portable terminal 200, respectively. As described above, a user may perform an operation for simultaneously generating a touch event on touch screens 140 of the two portable terminals 100 and 200 using one hand. The user may perform an operation for generating a touch event corresponding to a certain gesture in the two portable terminals 100 and 200 using two hands or other objects.

When a gesture event is generated, the first portable terminal 100 and the second portable terminal 200 may create a context message corresponding to the gesture event. The portable terminals 100 and 200 compare at least one previously defined gesture event information to search previously matched and defined gesture event information. The portable terminals 100 and 200 may search given defined gesture event information according to the gesture event and orientation information. Further, the portable terminals 100 and 200 confirm a user function according to defined gesture event information, and create a context message requesting a corresponding user function.

When creation of a context message is terminated, the portable terminals 100 and 200 transmit/receive a corresponding context message, in step 503. When the context message is transmitted/received, the portable terminals 100 and 200 compare contents of a received contents message, its context message, or its gesture event information with each other. Furthermore, when the context message is associated with its context message, that is, when generation time point information of the gesture event matches generation time point of a gesture event or is generated within a valid time, is identical with its gesture form information defined in previously defined gesture event information or has relation, the portable terminals 100 and 200 may provide control such that a previously defined user function is performed. The previously defined gesture information may include a user function to be executed when a corresponding event is generated as described above, gesture form information of a gesture event to be confirmed from a context message received from another terminal, and allowable range information with respect to presence of agreement of a gesture event generation time point. The allowable range information may be information defining that it is valid that the gesture event is simultaneously generated or is generated within a given time. For example, if a gesture event corresponding to a right drag is generated in a close proximity communication function preparation mode, the previously defined gesture event information may be defined such that automatic pairing for a close proximity communication channel formation function is performed. In addition, an orientation information confirmation procedure may be included.

Furthermore, when a gesture event corresponding to a left drag is confirmed from a received context message, the previously defined gesture event information may be defined such that automatic pairing is performed based on address information of a terminal having transmitted a corresponding received context message. The definition of the gesture event information may be set and changed according to design of a designer.

As described above, through transmission/reception of the context message, the portable terminals 100 and 200 may search for a terminal of the other party to be connected with a user function to be performed according to generation of the corresponding gesture event. In step 505, the portable terminals 100 and 200 support functions such as automatic pairing, connection release, and file transfer are executed.

Figure 6:
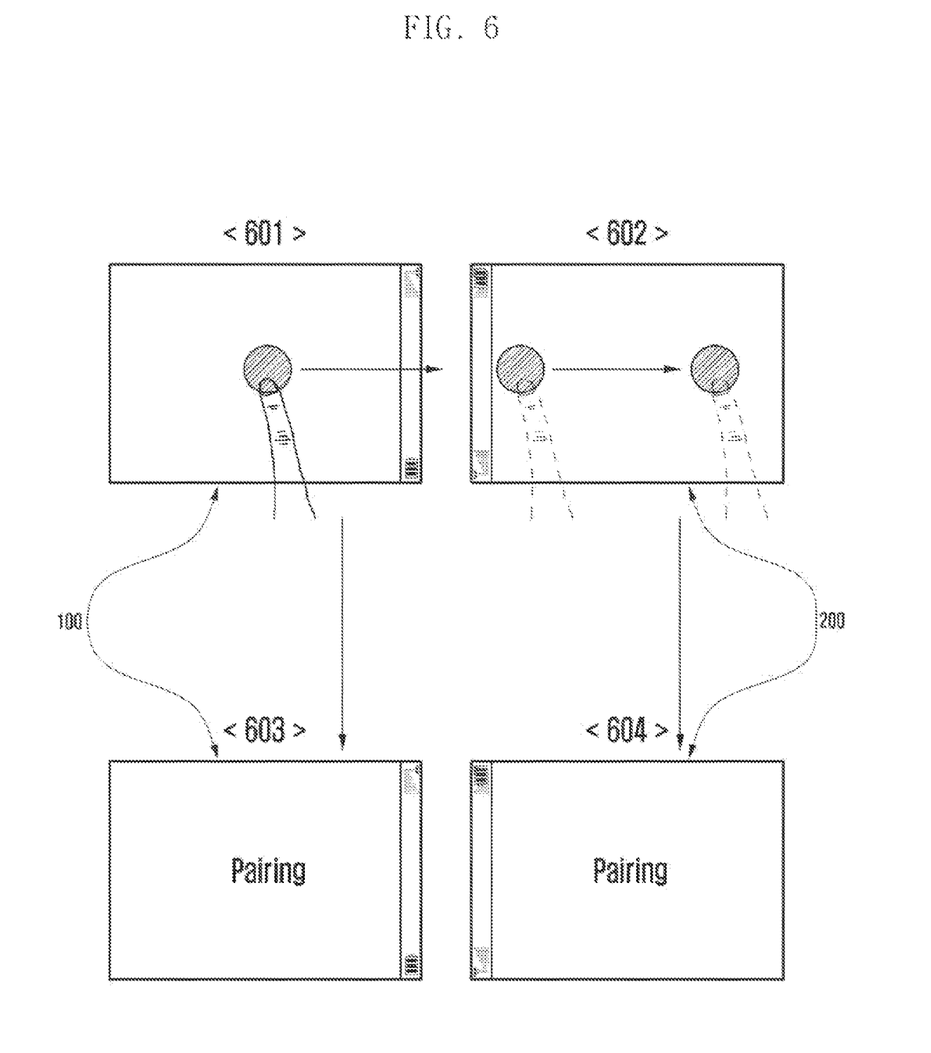
FIG. 6 is a diagram illustrating a screen for describing gesture recognition for automatic pairing, according to an embodiment of the present invention.

FIG. 6 is a diagram illustrating another gesture form for a pairing procedure during a close proximity communication channel operation, according to an embodiment of the present invention.

Referring to FIG. 6, the user may arrange the first portable terminal 100 and the second portable terminal 200 so that they are parallel to each other. Specifically, the user may arrange a top part of the first portable terminal 100 and a top part of the second portable terminal 200 so that they face each other, as illustrated in a screen 601 and a screen 602. Thus, the touch screens of the first portable terminal 100 and the second portable terminal 200 both face the same direction. Operation of a close proximity communication channel is not limited to the state of screens 601 and 603. Specifically, top parts of the first portable terminal 100 and the second portable terminal 200 may be arranged parallel to each other, as described with respect to the screens 401 and 402 of FIG. 4.

The user may arrange the portable terminals 100 and 200 in a line and then control an operation of a close proximity communication channel by, for example, generating a gesture event for automatic pairing. As illustrated in FIG. 6, the gesture event may include performing touch-down on a touch screen of the first portable terminal 100, dragging the touch to a touch screen of the second portable terminal 200, and releasing the touch on the touch screen of the second portable terminal 200. As a result, drag events are generated on the touch screens of the first portable terminal 100 and the second portable terminal 200 within a given time interval. Because a head of the second portable terminal 200 and a head of the first portable terminal 100 are arranged to face each other, a gesture event generated from the second portable terminal 200 may have a direction opposite to that of a gesture event generated from the first portable terminal 100. A gesture event is generated in the portable terminals 100 and 200, and the portable terminals 100 and 200 may generate a context message corresponding to the gesture event, as described above, and then transmit/receive the context message to/from each other to confirm a terminal of the other party which will operate a close proximity communication function based on the gesture. After confirming the terminal of the other party, the portable terminals 100 and 200 may perform a pairing procedure as illustrated in a screen 603 and a screen 604 of FIG. 6.

The foregoing embodiment has illustrated a case where the gesture events generated by respective portable terminals 100 and 200 are in opposing directions. However, the embodiments of the present invention are not limited thereto. Specifically, when a head of the first portable terminal 100 and a head of the second portable terminal 200 are arranged in a line, gesture events generated in the portable terminals 100 and 200 may have the same direction. A close proximity communication function based on a gesture may be performed according to which scheme previously defined gesture event information is defined. A close proximity communication function preparation mode may be set such that corresponding portable terminals 100 and 200 may automatically perform a pairing procedure. Accordingly, when the close proximity communication function preparation mode is not set, the portable terminals 100 and 200 may recognize an event for controlling an operation of a user function corresponding thereto.

Figure 7:
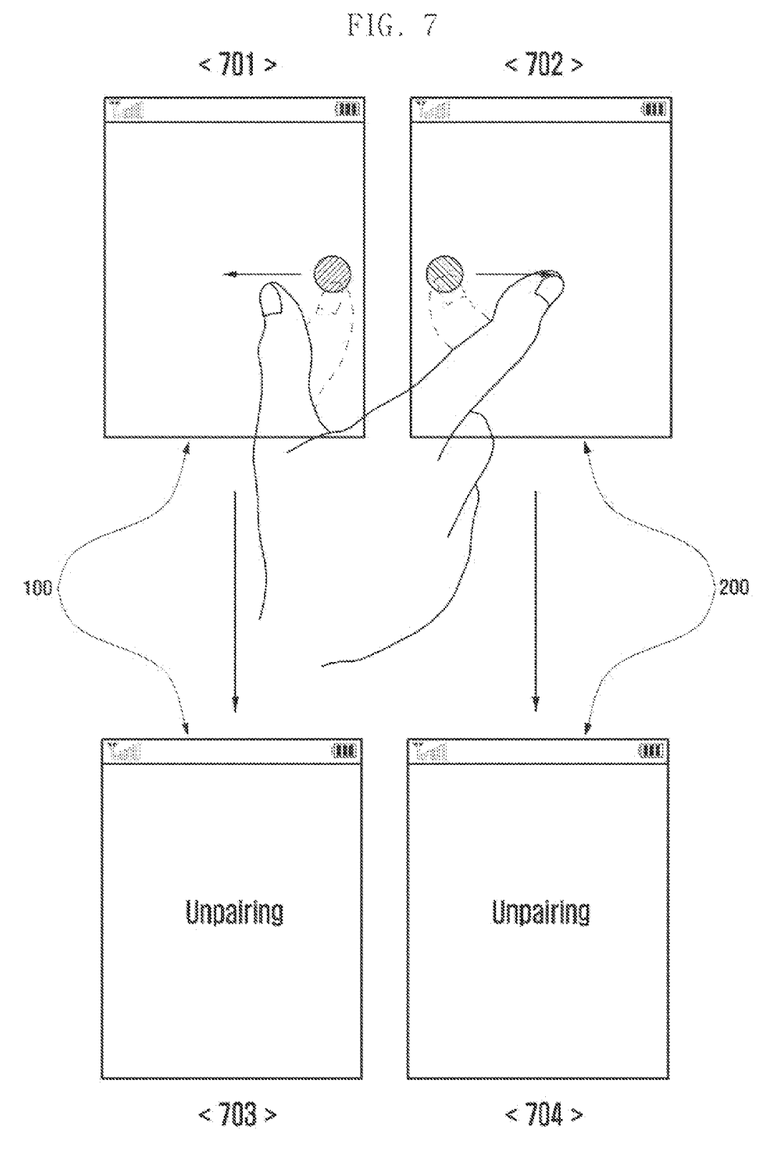
FIG. 7 is a diagram illustrating a screen for describing gesture recognition for communication channel connection release, according to an embodiment of the present invention.

FIG. 7 is a diagram illustrating a gesture form for a connection release procedure during an operation of a close proximity communication channel, according to an embodiment of the invention. The portable terminals 100 and 200 exist in a state in which a close proximity communication channel is connected.

Referring to FIG. 7, the user may arrange the first portable terminal 100 and the second portable terminal 200 so that they are parallel to each other, as illustrated by a screen 701 and a screen 702. A gesture event for connection release may be generated on the touch screens of the first portable terminal 100 and the second portable terminal 200. The user may perform a drag operation from right to left on the touch screen of the first portable terminal 100 using one or two fingers, a certain touch pen or the like, and the user may perform a drag operation from left to right on the touch screen of the second portable terminal 200 as a gesture event for connection release.

If the gesture event corresponding to the drag operation is generated, the first portable terminal 100 may generate a context message corresponding thereto and broadcast the generated context message to a peripheral terminal, namely, the second portable terminal 200. In the same manner, in the second portable terminal 200, if a gesture event is generated according to the drag operation, the second portable terminal 200 may generate and broadcast a context message corresponding to the generated gesture event to the first portable terminal 100. If the first portable terminal 100 and the second portable terminal 200 receive the context message, they may confirm contents of the received context message to check whether the confirmed contents of the received context message includes an event according to its gesture event. Further, when there is an event corresponding to its gesture event having generation time point information and gesture form information, the portable terminals 100 and 200 may execute a user function corresponding to the gesture event. Specifically, the portable terminals 100 and 200 may perform a communication channel connection release function or un-pairing procedure as illustrated in a screen 703 and a screen 704, of FIG. 7.

Figure 8:
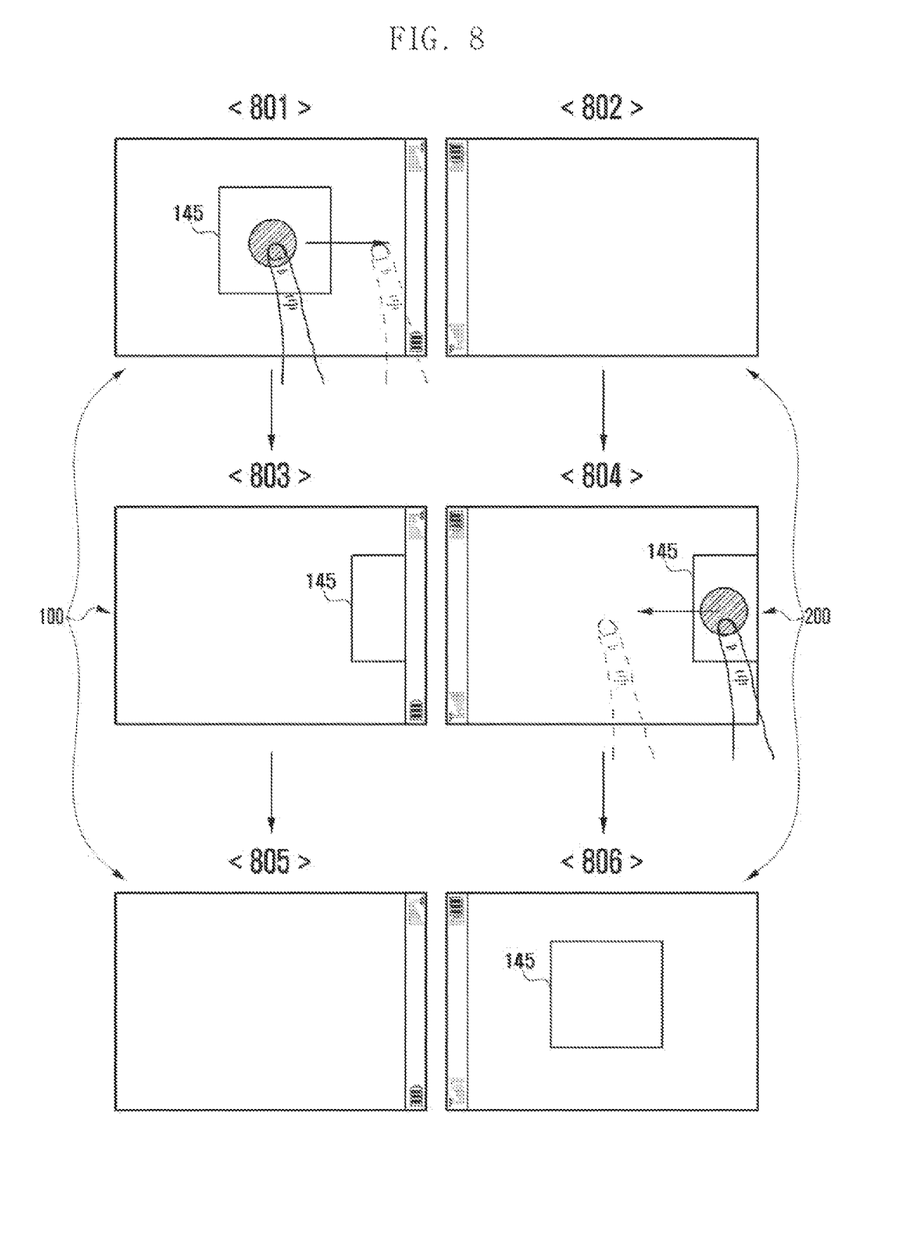
FIG. 8 is a diagram illustrating a screen for describing gesture recognition for transmission of contents files, according to an embodiment of the present invention.

FIG. 8 is a diagram illustrating a gesture form for a contents file transmission procedure during operation of a close proximity communication channel, according to an embodiment of the present invention. The portable terminals 100 and 200 are connected in a close proximity communication channel.

Referring to FIG. 8, a user may arrange the first portable terminal 100 and the second portable terminal 200 so that they are parallel to each other. Furthermore, the user may call a contents file 145 to be transmitted to the second portable terminal 200 from the first portable terminal 145. The first portable terminal 100 may output the contents file 145 on a touch screen as illustrated in a screen 801. The second portable terminal 200 may output a screen 802 without a separate screen display or a screen according to an operation of the second portable terminal 200. When the contents file 145 is output to the first portable terminal 100, the user may perform a gesture operation for transmitting the contents file 145 to the second portable terminal 200. For example, the user may perform a touch-down operation on the touch screen on which the contents file 145 is displayed and then perform an dragging operation for moving the corresponding contents file 145 in a direction of the second portable terminal 200. The first portable terminal 100 may collect selection information of the contents file 145, information of the contents file 145, and drag event information according to a gesture operation, and create and transmit a context message corresponding to the collected information to the second portable terminal 200.

The first portable terminal 100 may partially divide the information of the contents file 145 into image information of the contents file 145 displayed on a screen and data of an actual contents file. Information obtained by defining a divided information corresponding to the drag event of the user is included in the context message. The context message is transmitted to the second portable terminal 200. Specifically, the user performs a drag operation to move an image of the contents file 145 to a given boundary region of the touch screen of the first portable terminal 100. The first portable terminal 100 may transmit a context message including image information of the contents file 145 to the second portable terminal 200 based on a boundary region, as illustrated in screen 803. The boundary region may be either an edge region on the touch screen of each of the portable terminals 100 and 200 or at least one of various locations of the touch screen according to intention of the designer.

The first portable terminal 100 may include a part of actual data information of the contents file 145 in a context message and may transmit the context message to the second portable terminal 200. An amount of data to be transmitted may correspond to image information separated from a boundary region to be transmitted. When receiving the context message including image information corresponding to a contents file 145 from the first portable terminal 100, the second portable terminal 200 may output the received context message to a given region of a touch screen. The user may touch image information of the contents file 145 on a touch screen of the second portable terminal 200 to move a given region of the touch screen of the second portable terminal 200 through a drag operation, as shown in a screen 804.

When transmitting image information of the contents file 145, the first portable terminal 100 may support that a context message including transmission control right information of a corresponding contents file 145 is shared with the second portable terminal 200. Specifically, if a gesture event selecting an image of the contents file 145 is generated on a touch screen of the second portable terminal 200, the second portable terminal 200 may transmit the context message including information corresponding to the gesture event to the first portable terminal 100. The first portable terminal 200 may support screen change according to movement of the file contents in response to a gesture event provided from the second portable terminal 200.

After moving a contents file 145 output on a touch screen of the second portable terminal 200 to a given boundary region of the second portable terminal 200 as illustrated in a screen 806, the first portable terminal 100 removes a corresponding contents file 145 on a touch screen for each part and completely removed, as illustrated in a screen 805.

As described above, a method of operating a close proximity communication channel based on a gesture and a portable terminal system supporting the same may operate a close proximity communication channel between the portable terminals 100 and 200 by a simple gesture operation to intuitively operate it without writing or confirming complex authentication information.

The portable terminals 100 and 200 may further include various additional modules according to provision forms. Specifically, when each of the portable terminals 100 and 200 is a communication terminal, it may include constructions that are not mentioned such as a close proximity communication module for close proximity communication, an interface exchanging data in a wired communication scheme or a wireless communication scheme of each of the portable terminals 100 and 200, an Internet communication module communicating with an Internet to perform an Internet function, and a digital broadcasting module receiving and broadcasting digital broadcasting. Structural elements can be changed according to a convergence trend of a digital device. However, the portable terminals 100 and 200 may include structural elements equivalent to the foregoing structural elements. Further, the portable terminals 100 and 200 of the present invention may be substituted by specific constructions in the foregoing arrangements according to the provided form or another structure, as will be understood by those skilled in the present art.

Further, the portable terminals 100 and 200, according to an embodiment of the present invention, may include various types of devices supporting a communication service forward function. For example, the portable terminals 100 and 200 may include an information communication device and a multimedia device such as a Portable Multimedia Player (PMP), a digital broadcasting player, a Personal Digital Assistant (PDA), a music player (e.g., MP3 player), a portable game terminal, a Smart Phone, a notebook computer, and a handheld PC as well as various mobile communication terminals corresponding to various communication systems.

According to a method of operating a close proximity communication channel based on a gesture and a portable terminal system supporting the same, the invention may form or release a communication channel through a simple generation operation of an input signal, and support information transmission/reception between the terminals.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of releasing a communication channel between devices based on a gesture, the method comprising the steps of:
   receiving a first touch gesture on a touch screen of a device;
   determining a direction of the first touch gesture;
   generating a message for requesting release of a communication channel in response to the determined direction of the first touch gesture;
   transmitting the message from the device to another device, wherein the communication channel is established between the device and the another device; and
   if the device receives a response to the message from the another device, releasing the communication channel between the another device and the device, wherein if the another device receives a second touch gesture corresponding to the first touch gesture, the another device transmits the response to the device in response to the message from the device,
   wherein the direction of the first touch gesture is opposite to a direction of the second touch gesture.

2. The method of claim 1, wherein generating the message comprises collecting gesture generation time point information of the first touch gesture and gesture form information of the first touch gesture.

3. The method of claim 1, further comprising at least one of:
   collecting device orientation information at a time of receiving the first touch gesture;
   collecting address information of the device; and
   collecting user function information associated with the communication channel according to the first touch gesture.

4. The method of claim 3, wherein collecting the user function information comprises:
   obtaining gesture event information for the first touch gesture event in which a user function is previously defined; and
   confirming the user function information from previously defined event information.

5. The method of claim 1, further comprising:
   confirming generation time point information of the first touch gesture included in the received message or an allowable range of a generation time point of the first touch gesture after transmitting the message; and
   comparing a relationship between gesture form information included in the received message and form information of the first touch gesture, wherein the communication channel is released with the another device having transmitted the received message according to the comparison result.

6. The method of claim 1, wherein the first touch gesture and second touch gesture move farther away from each other in opposite direction.

7. The method of claim 1, wherein generating the first touch gesture comprises:
   arranging the device parallel to the another device; and
   generating the first touch gesture on the touch screen of the device in a direction toward the another device using at least one of one finger, two fingers, and touchable objects.

8. The method of claim 1, wherein generating the first touch gesture comprises:
   arranging the device parallel to the another device; and
   generating the first touch gesture on the touch screen of the device in a direction opposite the another device using at least one of one finger, two fingers, and touchable objects.

9. A device system for releasing a communication channel between devices using a gesture-based operation, the device system comprising:
   a first device comprising a first touch screen; and
   a second device comprising a second touch screen, wherein the second device establishes a communication channel with the first device,
   wherein the first device and the second device receive first and second touch gestures on the first and second touch screens, respectively, determine a direction of the first and second touch gestures, generate at least one of transmit and receive a message in response to the determined first and second touch gestures, release the communication channel based on the message,
   wherein the direction of the first touch gesture is opposite to a direction of the second touch gesture.

10. The device system of claim 9, wherein each of the first device and the second device comprises:
   a memory storing an operation function of a communication channel to be released when a corresponding first and second touch gesture is generated, preset first and second touch gesture information defining gesture form information to be included in the message, and allowable range information of first and second touch gesture generation time points; and
   a controller confirming a received message, determining whether there is first and second touch gestures of the received message that matches event generation time point information of the first and second touch gestures or that is within an allowable range, and whether there is gesture form information of the received message associated with defined gesture form information to control the operation of the communication channel.

11. The device system of claim 10, wherein, when the first and second touch gestures match event generation time point information or is within an allowable range, and when the gesture form information is associated with at least one of gesture form information generated from the first and second devices and orientation information of the gesture generation time point, the controller collects address information from the message to release the communication channel.

12. The device system of claim 11, wherein each of the first and second touch screens are arranged so that the first and second devices are parallel to each other, and each of the first and second touch screens generate the first and second touch gestures in directions toward each other.

13. The device system of claim 10, wherein, when the received message matches the first and second touch gestures generation time point information or is within the allowable range while the communication channel is connected, the controller releases a connection of the communication channel.

14. The device system of claim 13, wherein each of the first and second touch screens are arranged so that the first and second devices are parallel to each other, and each of the first and second touch screens generates the first and second touch gestures in directions opposite to each other.

15. The device system of claim 9, wherein the first touch gesture and second touch gesture move farther away from each other in opposite direction.

16. A device comprising:
a controller configured to receive a first touch gesture on a touch screen, generate a message for requesting release of a communication channel in response to receiving the first touch gesture, transmit the message to an external device, release the communication channel with the external device in response to receiving a response to the message from the external device, the response including information on a second touch gesture corresponding to the first touch gesture,
wherein the direction of the first touch gesture is opposite to a direction of the second touch gesture.

17. A method of releasing a communication channel between devices based on a gesture, the method comprising:
receiving a first touch gesture on a touch screen;
generating a message for requesting release of a communication channel in response to receiving the first touch gesture;
transmitting the message to an external device; and
releasing the communication channel with the external device in response to receiving a response to the message from the external device, the response including information on a second touch gesture corresponding to the first touch gesture,
wherein the direction of the first touch gesture is opposite to a direction of the second touch gesture.

* * * * *